United States Patent
Chang et al.

(10) Patent No.: US 11,878,921 B2
(45) Date of Patent: Jan. 23, 2024

(54) NANOFILTRATION MEMBRANE FOR TREATING PRINTING AND DYEING WASTEWATER AND ITS PREPARATION METHOD

(71) Applicants: Tiangong University, Tianjin (CN); Zhejiang Jinmo Environmental Technology Co., Ltd, Zhejiang (CN)

(72) Inventors: Na Chang, Tianjin (CN); Haitao Wang, Tianjin (CN); Yinong Xu, Zhejiang (CN); Donggen Chen, Zhejiang (CN); Rui Liu, Zhejiang (CN); Wei Shao, Tianjin (CN); Zedong Li, Zhejiang (CN); Yanjun Jia, Tianjin (CN); Miaomiao Yin, Tianjin (CN)

(73) Assignees: Tiangong University, Tianjin (CN); Zhejiang Jinmo Environmental Technology Co., Ltd, Zhejiang (CN)

( * ) Notice: Subject to any disclaimer, the term of this patent is extended or adjusted under 35 U.S.C. 154(b) by 0 days.

(21) Appl. No.: 17/889,371

(22) Filed: Aug. 16, 2022

(65) Prior Publication Data
US 2023/0100994 A1   Mar. 30, 2023

(30) Foreign Application Priority Data
Aug. 18, 2021 (CN) .......................... 202110951328.1

(51) Int. Cl.
*C02F 1/44* (2023.01)
*C02F 101/30* (2006.01)

(52) U.S. Cl.
CPC ........ *C02F 1/442* (2013.01); *C02F 2101/308* (2013.01)

(58) Field of Classification Search
CPC .. B01D 61/027; B01D 69/1251; B01D 71/56; B01D 2323/22
See application file for complete search history.

(56) References Cited

U.S. PATENT DOCUMENTS

2008/0251447 A1* 10/2008 Koumoto ............. B01D 69/125
                                                              210/500.38

FOREIGN PATENT DOCUMENTS

| CN | 102101020 A | * | 6/2011 | |
| CN | 104667759 A | * | 6/2015 | |
| CN | 110960987 A | * | 4/2020 | ........... B01D 61/025 |
| CN | 111282458 A | * | 6/2020 | ......... B01D 67/0002 |
| JP | 2015139741 A | * | 8/2015 | |

OTHER PUBLICATIONS

Liu T—CN-110960987-A machine translation—Apr. 2020 (Year: 2020).*

* cited by examiner

*Primary Examiner* — Bradley R Spies
(74) *Attorney, Agent, or Firm* — JCIPRNET

(57) ABSTRACT

The invention relates to the field of industrial wastewater treatment, and particularly discloses a nanofiltration membrane for treating printing and dyeing wastewater and its preparation method. The preparation method comprises the following steps: S1, pouring an aqueous solution containing m-phenylenediamine, camphorsulfonic acid and triethylamine onto the surface of a polysulfone ultrafiltration membrane, setting still for 10 s to 30 s, and then removing the excess aqueous solution from the surface; S2, pouring an organic solution containing trimesoyl chloride and an interface auxiliary polymerization agent onto the surface of the membrane obtained in step S1, reacting for 5 s to 20 s, and then removing the excess solution from the surface; and S3, setting the membrane obtained in step S2 still and then carrying out heat treatment and water rinsing on the membrane in sequence, thus obtaining the nanofiltration membrane.

10 Claims, 12 Drawing Sheets

NANOFILTRATION MEMBRANE FOR TREATING PRINTING AND DYEING WASTEWATER AND ITS PREPARATION METHOD

CROSS-REFERENCE TO RELATED APPLICATION

This application claims the priority benefit of China application serial no. 202110951328.1, filed on Aug. 18, 2021. The entirety of the above-mentioned patent application is hereby incorporated by reference herein and made a part of this specification.

BACKGROUND OF THE INVENTION

1. Technical Field

The application relates to the field of industrial wastewater treatment, and more particularly, to a nanofiltration membrane for treating printing and dyeing wastewater and its preparation method.

2. Description of Related Art

Textile printing and dyeing is one of the most internationally competitive traditional industries in China, but it discharges about 1.8 to 2 billion tons of salty wastewater every year, accounting for about 11% of the country's total wastewater discharge. It is one of the main polluting industries in China. Therefore, in the field of textile printing and dyeing, in order to reduce the discharge of wastewater, reverse osmosis membranes are currently used to treat and recycle printing and dyeing wastewater. However, due to the too high desalination rate of the reverse osmosis membrane, in the actual operation process, the operating pressure is high, generally not less than 1.5 MPa, the water reuse rate is low, generally not more than 50%, and the reverse osmosis membrane is easily polluted. In addition, there are also problems such as easy fouling and clogging of the reverse osmosis membrane, which causes a dramatic reduction of the amount of recycled water over time and requires frequent chemical cleaning. In addition, from the research on the advanced treatment of printing and dyeing wastewater, it is found that the retention rate of NaCl by the reverse osmosis membrane can reach 99% or above, and the conductivity of the recycled water is below 200 μS/cm, and as required by the water recycling standard for printing and dyeing, the conductivity of the water only needs to be less than 2500 μS/cm, that is, the retention rate of NaCl only needs to be 92%, then the requirement is met. For this reason, the use of reverse osmosis filtration membranes in the treatment of printing and dyeing wastewater is a waste and causes a high treatment cost. Therefore, those skilled in the art have further studied the use of nanofiltration membranes to treat printing and dyeing wastewater.

The separation pore sizes of nanofiltration membranes are in the nanoscale range, and they have multiple separation effects such as sieving effect and charging effect, which can effectively remove small molecular organic pollutants such as dyes in printing and dyeing wastewater. Compared with reverse osmosis membranes, nanofiltration membranes have the advantages of low working pressure, energy saving and large amount of recovered water. However, the current nanofiltration membranes still have the following shortcomings: (1) low rejection rate against monovalent salts (such as NaCl): the monovalent salt (NaCl) rejection rate of conventional nanofiltration membranes is generally below 50%; (2) low water flux: especially for some special nanofiltration membranes, that is, for nanofiltration membranes with a NaCl rejection rate of 90%, according to documents, patent reports or commercialized nanofiltration membranes, the water flux usually does not exceed 20 L/(m$^2$·h), which fails to meet industrial reuse water demand; (3) high filtration pressure: the filtration pressure of existing documents and commercialized nanofiltration membranes is generally above 1.0 MPa, and some even have higher filtration pressure than the low-pressure reverse osmosis, which causes high energy consumption in industrial application; (4) serious membrane fouling: the higher the filtration pressure, the more significant the compaction effect of a fouling layer on the membrane surface, the more serious the fouling and organic and microbial contamination on the membrane surface, the more obvious the decrease in the amount of recovered water over time, and the more frequent chemical cleaning.

Therefore, under the premise of a certain operating pressure, there will be a "trade-off effect" between the water flux and the desalination rate during the preparation of the nanofiltration membranes, that is, when adjusting the performance of nanofiltration membranes, it is often faced with the problem that increasing the water flux of the membranes will always lose the desalination rate. How to coordinate the contradictions between the water flux and the desalination rate of a membrane, so as to greatly improve the water flux of the nanofiltration membrane while ensuring its rejection efficiency is a current research direction. Further, for nanofiltration membranes, under the premise of a certain water production, if the water flux of the nanofiltration membranes can be greatly improved while ensuring the rejection efficiency, the operating pressure and unit energy consumption can be effectively reduced. Moreover, the lower operating pressure can also reduce the compaction effect on the fouling layer and mitigate the membrane fouling problem faced in long-term operation. For this reason, how to effectively reduce the operating pressure and improve the water flux while ensuring the target injection has become the difficulty in the preparation of special nanofiltration membranes for wastewater treatment in the printing and dyeing industry.

BRIEF SUMMARY OF THE INVENTION

In order to solve the above technical problems, the application provides a nanofiltration membrane for treating printing and dyeing wastewater and its preparation method.

In a first aspect, provided by the application is a preparation method of a nanofiltration membrane for treating printing and dyeing wastewater, adopting the following technical solution:

A preparation method of a nanofiltration membrane for treating printing and dyeing wastewater, comprising the following steps:

S1, pouring an aqueous solution containing m-phenylenediamine, camphorsulfonic acid and triethylamine onto a surface of a polysulfone ultrafiltration membrane, setting still for 10 s to 30 s, and then removing the excess aqueous solution from the surface, wherein the content of m-phenylenediamine ranges from 0.7 wt % to 2 wt %, the content of camphorsulfonic acid ranges from 2 wt % to 2.5 wt %, and the content of triethylamine ranges from 1 wt % to 1.5 wt %;

S2, pouring an organic solution containing trimesoyl chloride and an interface auxiliary polymerization agent onto the surface of the membrane obtained in step S1, reacting for 5 s to 20 s, and then removing the excess solution from the surface, wherein the interface auxiliary polymerization agent is acetone or acetic ester; the content of acetone ranges from 0.5 wt % to 1 wt %, and the content of acetic ester ranges from 0.3 wt % to 8 wt %;

the content of the trimesoyl chloride ranges from 0.03 wt % to 0.1 wt %; and

S3, setting the membrane obtained in step S2 still and then carrying out heat treatment and water rinsing on the membrane in sequence, thus obtaining the nanofiltration membrane.

Based on the above technical solution, in the application, using a polysulfone ultrafiltration membrane as a base membrane, m-phenylenediamine (MPD) as a water phase monomer, trimesoyl chloride (TMC) as an organic phase monomer, a nanofiltration membrane is prepared by polymerizing m-phenylenediamine and trimesoyl chloride on the surface of the polysulfone ultrafiltration membrane to form a polyamide (PA) active layer. The use of camphorsulfonic acid as a phase transfer catalyst in the application can promote the diffusion of m-phenylenediamine to the organic phase containing trimesoyl chloride, thereby promoting the polymerization reaction of the aqueous phase and the organic phase and increasing the reaction speed. As an acid consuming agent, the triethylamine of the application can react with hydrochloric acid generated by the polymerization reaction, thereby reducing the possibility that the hydrochloric acid affects the equilibrium of the polymerization reaction.

In the application, a specific water phase monomer is selected to react with the organic phase monomer, and the contents of the water phase monomer and the organic phase monomer are controlled in percentage by weight, so that the water phase and the organic phase are more compatible within a certain polymerization reaction time, the diffusion of MPD to TMC is speeded up, and the polymerization of the water phase monomer and the organic phase monomer is promoted. In this way, the formed active layer is moderate in density, and the obtained nanofiltration membrane can have both high water flux and high rejection rate.

Moreover, in the application, interfacial auxiliary polymerization agents are added to the organic phase, and the use of two specific interfacial auxiliary polymerization agents, acetone and acetic ester, reduces the interfacial tension of the organic phase, enhances the compatibility between the water phase and the organic phase, forms a blending zone, promotes the polymerization reaction, and changes the ridge structure and the leaf structure on the surface of the PA active layer. In this way, the size of the ridge structure is increased, the density is reduced, and the effective surface area of the leaf structure is increased, thereby improving the water flux of the nanofiltration membrane. In addition, because the rejection rate of the nanofiltration membrane is closely related to the surface charge of the PA layer, the interfacial auxiliary polymerization agents are introduced in the application only for changing the ridge structure and the leaf structure of the PA active layer, which almost causes no effect on the negative charge density on the surface. Therefore, the application can maintain a high rejection rate of the nanofiltration membrane while improving the water flux of the nanofiltration membrane. Further, by controlling the contents of acetone and acetic ester in percentage by weight within specific ranges in the application, the surface of the PA layer is moderate in density and both high water flux and high rejection rate are achieved.

To sum up, according to the application, by introducing a specific content of acetic ester or acetone in percentage by weight into the organic phase and controlling the reaction conditions within a specific range, the PA active layer on the surface of the nanofiltration membrane prepared in the application is moderate in density, the filtration pressure is low, and the surface of the nanofiltration membrane is not easy to clog and scale, which reduces the degree of membrane fouling and the cleaning frequency. Moreover, the water flux and the rejection rate are high, the traditional trade-off effect is broken through, and both high water flux and high rejection rate are achieved. In the actual application process, the water reuse rate of printing and dyeing wastewater can be increased to 60% or above.

In addition, due to the low water flux of the traditional nanofiltration membranes, in order to improve the water reuse rate, the filtration pressure is generally about 1.5 MPa or even higher, which causes higher energy consumption in practical application of the filtration membranes. However, the nanofiltration membrane of the application can have a high water flux at 0.5 MPa, which effectively reduces production energy consumption. Therefore, the nanofiltration membrane of the application is suitable for large-scale industrial production.

Preferably, wherein the content of the acetone ranges from 0.85 wt % to 1 wt %.

By adopting the above technical solution, in the application, the content of acetone in percentage by weight is further controlled to be within the above-mentioned specific range, which can further ensure that the density of the PA active layer is within a suitable range and that the ridge and leaf structures on the surface of the PA active layer are of better shape, thus improving the water flux of the nanofiltration membrane.

Preferably, wherein the content of the acetic ester ranges from 2 wt % to 6 wt %.

By adopting the above technical solution, the application further controls the content of acetic ester in percentage by weight to be within the above-mentioned specific range, which can further ensure that the density of the PA active layer is within a suitable range, and the ridge and leaf structures on the surface of the PA active layer are of better shape, thus improving the water flux of the nanofiltration membrane. The content of acetic ester in the application is further selected to be 4 wt %.

Preferably, wherein the acetic ester is any one of ethyl acetate, propyl acetate, butyl acetate, amyl acetate, heptyl acetate and n-octyl acetate.

By adopting the above-mentioned technical solution, in the application, any one of ethyl acetate, propyl acetate, butyl acetate, amyl acetate, heptyl acetate and n-octyl acetate is used and added to the organic phase, thereby promoting the compatibility between the organic phase and the water phase, changing the structure and morphology of the PA active layer, reducing the density of the PA active layer, and improving the water flux of the nanofiltration membrane.

Preferably, wherein the organic solvent is n-Hexane or Isopar G.

By adopting the above-mentioned technical solution where Isopar G belongs to isoparaffins G, in the application, two organic solvents, n-hexane and Isopar G, are further selected to achieve better compatibility with the water phase, so that the polymerization of the water phase and the organic phase can be promoted. In this way, the water flux of the nanofiltration membrane can be further improved.

Preferably, wherein specifically, the heat treatment is carried out for curing at a temperature of 60° C. to 100° C. for 2 min to 5 min.

By adopting the above technical solution, in the application, after the organic solvent is volatilized, the polysulfone ultrafiltration membrane is placed in an oven, and within a specific temperature range, the polysulfone ultrafiltration membrane is heat-treated for a specific time to obtain a nanofiltration membrane with a moderate density.

Preferably, wherein the heat treatment is carried out at a temperature of 80° C. to 100° C.

By adopting the above technical solution, in the application, the temperature of the heat treatment is further controlled within a specific range, which can further promote the polymerization reaction. In this way, the polymerization reaction is carried out more thoroughly and the density of the PA active layer is within a better range, thus further improving the water flux of the nanofiltration membrane.

Preferably, wherein the polysulfone ultrafiltration membrane has a pore size ranging from 0.018 μm to 0.025 μm, and a pure water flux ranging from 200 L/(m²·h) to 400 L/(m²·h).

By adopting the above technical solution, the application uses a polysulfone ultrafiltration membrane within the above-mentioned pore size range and pure water flux range as the base membrane and carries out a polymerization reaction on the base membrane to obtain a nanofiltration membrane with a moderate density.

Preferably, wherein the water rinsing is carried out two to three times.

By adopting the above technical solution, in the application, the membrane surface is rinsed with water two to three times after heat treatment, so that the unreacted residue on the membrane surface is fully removed, and the possibility of the residue interfering with the use of the nanofiltration membrane is reduced.

In a second aspect, provided by the application is a nanofiltration membrane prepared by the preparation method of a nanofiltration membrane for treating printing and dyeing wastewater.

By adopting the above technical solution, the nanofiltration membrane of the application has both high water flux and high salt rejection rate at a low filtration pressure and breaks through the traditional trade-off effect, so that the reuse rate of printing and dyeing wastewater can reach 60% or above. Therefore, the requirements of practical applications can be met to a great extent.

To sum up, the application includes at least one of the following beneficial technical effects.

1. In the application, by introducing a specific interfacial auxiliary polymerization agent in the preparation method of a nanofiltration membrane, the structure and morphology of the surface of the nanofiltration membrane are changed, so that the surface of the prepared nanofiltration membrane is moderate in density, thereby reducing the filtration pressure of the nanofiltration membrane effectively. The surface of the nanofiltration membrane is not easy to clog and scale, which reduces the degree of membrane fouling and the cleaning frequency.

2. At a filtering pressure of 0.5 MPa, the prepared nanofiltration membrane of the application has a NaCl rejection rate of 94% or above and a MgSO$_4$ retention rate of 99% or above, and its pure water flux is greater than 25 L/m²·h. The nanofiltration membrane has both high water flux and high salt rejection rate.

3. By using the prepared nanofiltration membrane of the application, the reuse rate of printing and dyeing wastewater can reach 60% or above. Therefore, the requirements of practical applications can be met to a great extent.

4. Compared with the traditional nanofiltration membranes, the nanofiltration membrane prepared in the application only requires a filtration pressure of 0.5 MPa and can consume less energy consumption in practical application, thus being suitable for large-scale industrial production.

BRIEF DESCRIPTION OF THE SEVERAL VIEWS OF THE DRAWINGS

FIG. 2(a) shows the surface appearance of a nanofiltration membrane when the content of acetone is 0.5 wt %, FIG. 2(b) shows the surface appearance of a nanofiltration membrane when the content of acetone is 1 wt %, FIG. 2(c) shows the surface appearance of a nanofiltration membrane when the content of acetone is 0.1 wt %, and FIG. 2(d) shows the surface appearance of a nanofiltration membrane when the content of acetone is 2 wt %;

FIG. 3(a) shows the surface appearance of a nanofiltration membrane when the content of ethyl acetate is 0.5 wt %, FIG. 3(b) shows the surface appearance of a nanofiltration membrane when the content of ethyl acetate is 0.3 wt %, FIG. 3(c) shows the surface appearance of a nanofiltration membrane when the content of ethyl acetate is 8 wt %, FIG. 3(d) shows the surface appearance of a nanofiltration membrane when the content of ethyl acetate is 2 wt %, FIG. 3(e) shows the surface appearance of a nanofiltration membrane when the content of ethyl acetate is 6 wt %, FIG. 3(f) shows the surface appearance of a nanofiltration membrane when the content of ethyl acetate is 4 wt %, and FIG. 3(g) shows the surface appearance of a nanofiltration membrane when the content of ethyl acetate is 10 wt %;

FIG. 4(a) shows the surface appearance of a nanofiltration membrane in the case of use of propyl acetate, FIG. 4(b) shows the surface appearance of a nanofiltration membrane in the case of use of butyl acetate, FIG. 4(c) shows the surface appearance of a nanofiltration membrane in the case of use of amyl acetate, FIG. 4(d) shows the surface appearance of a nanofiltration membrane in the case of use of heptyl acetate, and FIG. 4(e) shows the surface appearance of a nanofiltration membrane in the case of use of n-octyl acetate.

FIG. 5(a) shows the surface appearance of a nanofiltration membrane in the case of addition of Isopar G as an organic solvent, FIG. 5(b) shows the surface appearance of a nanofiltration membrane in the case of addition of Isopar H as an organic solvent, and FIG. 5(c) shows the surface appearance of a nanofiltration membrane in the case of addition of Isopar L as an organic solvent.

DETAILED DESCRIPTION OF THE INVENTION

Figure 1:
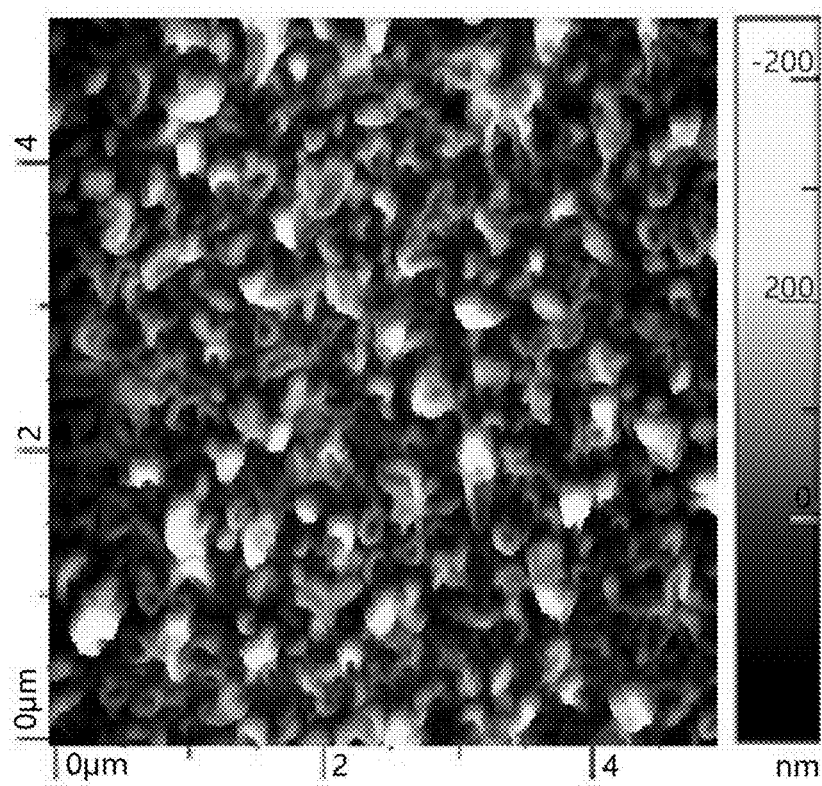
FIG. 1 shows the surface appearance of a membrane under AFM without addition of any interfacial auxiliary polymerization agent.

The application will be further described in detail below with reference to embodiments.

Material Sources m-phenylenediamine was purchased from Acros Organics with a purity of 99 wt %;

Camphorsulfonic acid was purchased from TCI (Shanghai) Development Co., Ltd., with a purity of >98 wt %;

Triethylamine was purchased from Tianjin Kermel Chemical Reagent Co., Ltd., analytical Grade;

The polysulfone ultrafiltration membrane is home-made, with a pore size range of 0.018 μm to 0.025 μm and a pure water flux of 200 L/(m²·h) to 400 L/(m²·h);

Trisic acid chloride was purchased from Acros Organics, with a purity of 99 wt %;

Acetone was purchased from Tianjin Fengchuan Chemical Reagent Co., Ltd., analytical Grade;

Ethyl acetate was purchased from Tianjin Kermel Chemical Reagent Co., Ltd., analytical Grade;

Propyl acetate, butyl acetate, amyl acetate, and n-octyl acetate were all purchased from Jiuding Chemical Co., Ltd., wherein the purity of propyl acetate and amyl acetate was 99 wt %, the purity of butyl acetate was higher than or equal to 99.7 wt %, and the purity of n-octyl acetate was 98 wt %;

Heptyl acetate was purchased from Aladdin Chemical Reagent Co., Ltd., with a purity of higher than 99 wt %;

n-Hexane was purchased from Tianjin Kermel Chemical Reagent Co., Ltd., analytical Grade;

Isopar G, Isopar H and Isopar L were all purchased from TICHEM.

EXAMPLE 1

A preparation method of a nanofiltration membrane for treating printing and dyeing wastewater includes the following steps:

S1. first clamping a polysulfone ultrafiltration membrane in a plexiglass frame with the surface facing up, wiping off the water droplets on the surface of the polysulfone ultrafiltration membrane, and then pouring an aqueous solution containing m-phenylenediamine, camphorsulfonic acid and triethylamine onto the surface of the polysulfone ultrafiltration membrane, setting still for 10 s, and then pour off the excess aqueous solution, and purging the surface of the polysulfone ultrafiltration membrane with nitrogen until no aqueous solution remains, wherein the content of m-phenylenediamine is 0.7 wt %, the content of camphorsulfonic acid is 2 wt %, and the content of triethylamine is 1 wt %;

S2. pouring a n-hexane solution containing trimesoyl chloride and acetone onto the surface of the membrane obtained in step S1, reacting for 5 s, and pouring off the excess solution on the surface, wherein the content of acetone is 0.5 wt %, and the content of trimesoyl chloride is 0.03 wt %; and S3. setting the membrane obtained in step S2 still, putting the membrane into an oven after the n-hexane volatilizes, carrying out heat treatment and curing for 2 min at a temperature of 60° C., rinsing the surface twice with deionized water, and removing residues from the surface, thus obtaining a nanofiltration membrane.

EXAMPLE 2

A preparation method of a nanofiltration membrane for treating printing and dyeing wastewater includes the following steps:

S1. first clamping a polysulfone ultrafiltration membrane in a plexiglass frame with the surface facing up, wiping off the water droplets on the surface of the polysulfone ultrafiltration membrane, and then pouring an aqueous solution containing m-phenylenediamine, camphorsulfonic acid and triethylamine onto the surface of the polysulfone ultrafiltration membrane, setting still for 20 s, and then pour off the excess aqueous solution, and purging the surface of the polysulfone ultrafiltration membrane with nitrogen until no aqueous solution remains, wherein the content of m-phenylenediamine is 1.35 wt %, the content of camphorsulfonic acid is 2.25 wt %, and the content of triethylamine is 1.25 wt %;

S2. pouring a n-hexane solution containing trimesoyl chloride and acetone onto the surface of the membrane obtained in step S1, reacting for 12.5 s, and pouring off the excess solution on the surface, wherein the content of acetone is 0.75 wt %, and the content of trimesoyl chloride is 0.065 wt %; and S3. setting the membrane obtained in step S2 still, putting the membrane into an oven after the n-hexane volatilizes, carrying out heat treatment and curing for 3.5 min at a temperature of 70° C., rinsing the surface three times with deionized water, and removing residues from the surface, thus obtaining a nanofiltration membrane.

EXAMPLE 3

A preparation method of a nanofiltration membrane for treating printing and dyeing wastewater includes the following steps:

S1. first clamping a polysulfone ultrafiltration membrane in a plexiglass frame with the surface facing up, wiping off the water droplets on the surface of the polysulfone ultrafiltration membrane, and then pouring an aqueous solution containing m-phenylenediamine, camphorsulfonic acid and triethylamine onto the surface of the polysulfone ultrafiltration membrane, setting still for 30 s, and then pour off the excess aqueous solution, and purging the surface of the polysulfone ultrafiltration membrane with nitrogen until no aqueous solution remains, wherein the content of m-phenylenediamine is 2 wt %, the content of camphorsulfonic acid is 2.5 wt %, and the content of triethylamine is 1.5 wt %;

S2, puring an Isopar G solution containing trimesoyl chloride and acetone onto the surface of the membrane obtained in step S1, reacting for 20 s, and pouring off the excess solution on the surface, wherein the content of acetone is 1 wt %, and the content of trimesoyl chloride is 0.1 wt %; and S3, setting the membrane obtained in step S2 still, putting the membrane into an oven after the n-hexane volatilizes, carrying out heat treatment and curing for 5 min at a temperature of 65° C., rinsing the surface twice with deionized water, and removing residues from the surface, thus obtaining a nanofiltration membrane.

EXAMPLE 4

A preparation method of a nanofiltration membrane for treating printing and dyeing wastewater includes the following steps:

S1. first clamping a polysulfone ultrafiltration membrane in a plexiglass frame with the surface facing up, wiping off the water droplets on the surface of the polysulfone ultrafiltration membrane, and then pouring an aqueous solution containing m-phenylenediamine, camphorsulfonic acid and triethylamine onto the surface of the polysulfone ultrafiltration membrane, setting still for 30 s, and then pour off the excess aqueous solution, and purging the surface of the polysulfone ultrafiltration membrane with nitrogen until no aqueous solution remains, wherein the content of m-phenylenediamine is 1.5 wt %, the content of camphorsulfonic acid is 2.3 wt %, and the content of triethylamine is 1.1 wt %;

S2. pouring a n-hexane solution containing trimesoyl chloride and acetone onto the surface of the membrane obtained in step S1, reacting for 10 s, and pouring off the excess solution on the surface, wherein the content of acetone is 0.5 wt %, and the content of trimesoyl chloride is 0.1 wt %; and S3. setting the membrane obtained in step S2 still, putting the membrane into an oven after the n-hexane volatilizes, carrying out heat treatment and curing for 3 min at a temperature of 100° C., rinsing the surface three times with deionized water, and removing residues from the surface, thus obtaining a nanofiltration membrane.

EXAMPLE 5

A preparation method of a nanofiltration membrane for treating printing and dyeing wastewater is different from Example 4 in that in step S2, the content of acetone is 0.85 wt %.

EXAMPLE 6

A preparation method of a nanofiltration membrane for treating printing and dyeing wastewater is different from Example 4 in that in step S2, the content of acetone is 1 wt %.

EXAMPLE 7

A preparation method of a nanofiltration membrane for treating printing and dyeing wastewater is different from Example 4 in that acetone in step S2 is replaced with ethyl acetate.

EXAMPLE 8

A preparation method of a nanofiltration membrane for treating printing and dyeing wastewater is different from Example 7 in that in step S2, the content of ethyl acetate is 0.3 wt %.

EXAMPLE 9

A preparation method of a nanofiltration membrane for treating printing and dyeing wastewater is different from Example 7 in that the content of ethyl acetate is 8 wt %.

EXAMPLE 10

A preparation method of a nanofiltration membrane for treating printing and dyeing wastewater is different from Example 9 in that the content of ethyl acetate is 2 wt %.

EXAMPLE 11

A preparation method of a nanofiltration membrane for treating printing and dyeing wastewater is different from Example 9 in that the content of ethyl acetate is 6 wt %.

EXAMPLE 12

A preparation method of a nanofiltration membrane for treating printing and dyeing wastewater is different from Example 11 in that the content of ethyl acetate is 4 wt %.

EXAMPLE 13

A preparation method of a nanofiltration membrane for treating printing and dyeing wastewater is different from Example 12 in that ethyl acetate in step S2 is replaced with propyl acetate.

EXAMPLE 14

A preparation method of a nanofiltration membrane for treating printing and dyeing wastewater is different from Example 12 in that ethyl acetate in step S2 is replaced with butyl acetate.

EXAMPLE 15

A preparation method of a nanofiltration membrane for treating printing and dyeing wastewater is different from Example 12 in that ethyl acetate in step S2 is replaced with amyl acetate.

EXAMPLE 16

A preparation method of a nanofiltration membrane for treating printing and dyeing wastewater is different from Example 12 in that ethyl acetate in step S2 is replaced with heptyl acetate.

EXAMPLE 17

A preparation method of a nanofiltration membrane for treating printing and dyeing wastewater is different from Example 12 in that ethyl acetate in step S2 is replaced with n-octyl acetate.

EXAMPLE 18

A preparation method of a nanofiltration membrane for treating printing and dyeing wastewater is different from Example 17 in that n-hexane in step S2 is replaced with Isopar G.

EXAMPLE 19

A preparation method of a nanofiltration membrane for treating printing and dyeing wastewater is different from Example 12 in that n-hexane in step S2 is replaced with Isopar G.

EXAMPLE 20

A preparation method of a nanofiltration membrane for treating printing and dyeing wastewater is different from Example 3 in that the heat treatment in step S3 is carried out at 80° C.

EXAMPLE 21

A preparation method of a nanofiltration membrane for treating printing and dyeing wastewater is different from Example 3 in that the heat treatment in step S3 is carried out at 100° C.

EXAMPLE 22

A preparation method of a nanofiltration membrane for treating printing and dyeing wastewater is different from Example 7 in that the heat treatment in step S3 is carried out at 65° C.

EXAMPLE 23

A preparation method of a nanofiltration membrane for treating printing and dyeing wastewater is different from Example 7 in that the heat treatment in step S3 is carried out at 75° C.

EXAMPLE 24

A preparation method of a nanofiltration membrane for treating printing and dyeing wastewater is different from Example 2 in that in step S1, the content of m-phenylenediamine is 1.5 wt %, and in step S2, the content of trimesoyl chloride is 0.1 wt %.

EXAMPLE 25

A preparation method of a nanofiltration membrane for treating printing and dyeing wastewater is different from Example 2 in that in step S2, the reaction time is 10 s.

EXAMPLE 26

A preparation method of a nanofiltration membrane for treating printing and dyeing wastewater is different from Example 19 in that n-hexane in step S2 is replaced with Isopar H.

EXAMPLE 27

A preparation method of a nanofiltration membrane for treating printing and dyeing wastewater is different from Example 19 in that n-hexane in step S2 is replaced with Isopar L.

COMPARATIVE EXAMPLE 1

This comparative example is the same as Example 4 except that in step S2, acetone is not added.

COMPARATIVE EXAMPLE 2

This comparative example is the same as Example 4 except that the acetone in step S2 is replaced with N,N-dimethylformamide.

COMPARATIVE EXAMPLE 3

This comparative example is the same as Example 4 except that the acetone in step S2 is replaced with 1,3-dimethyl-2-imidazolidinone.

COMPARATIVE EXAMPLE 4

This comparative example is the same as Example 4 except that in step S2, the content of acetone is 0.1 wt %.

COMPARATIVE EXAMPLE 5

This comparative example is the same as Example 4 except that in step S2, the content of acetone is 2 wt %.

COMPARATIVE EXAMPLE 6

This comparative example is the same as Example 7 except that in step S2, the content of ethyl acetate is 0.1 wt %.

COMPARATIVE EXAMPLE 7

This comparative example is the same as Example 7 except that in step S2, the content of ethyl acetate is 10 wt %.

COMPARATIVE EXAMPLE 8

This comparative example is the same as Example 4 except that m-phenylenediamine in step S1 is replaced with p-phenylenediamine.

COMPARATIVE EXAMPLE 9

This comparative example is the same as Example 4 except that m-phenylenediamine in step S1 is replaced with 3,5-diaminobenzoic acid.

COMPARATIVE EXAMPLE 10

This comparative example is the same as Example 4 except that m-phenylenediamine in step S1 is replaced with 2-aminobenzenesulfonic acid.

Property Testing

1. The surface morphology of nanofiltration membranes prepared under different conditions was scanned by atomic force microscope (AFM), and the results are shown in FIGS. 1 to 5(c).

2. The nanofiltration membranes prepared in Examples 1 to 27 and Comparative Examples 1 to 10 were subjected to water flux test and rejection property test using a cross-flow filtration system, and the test results are shown in Table 1.

Test method: the prepared membrane samples were first put in 6 parallel filtration units, the effective area of each unit was 29.2 cm$^2$, the flow channel height was 1 mm, and the filtration was carried out in the total circulation mode. During this process, all permeating solutions and concentrates are returned to the feed, except for samples taken for analysis. The temperature (25° C.) of feed solution was monitored during the test. In filtration for each group, the membrane samples were first filtered at 0.5 MPa for at least 30 min to achieve compaction until a stable permeation flux was obtained. Membrane properties were tested at a filtration pressure of 0.5 MPa and a cross flow of 3 LPM. The water flux was calculated as:

$$J_w = \frac{\Delta V}{S \cdot \Delta t}$$

where, $J_w$ is the water flux, S is the effective membrane area, and $\Delta V$ is the amount of permeated water collected in a certain period of time M.

The rejection rates of nanofiltration membranes were measured with a NaCl solution having a concentration of 2000 mg/L and a MgSO$_4$ solution having a concentration of 2000 mg/L, respectively. An appropriate amount of NaOH solution was added to adjust the pH of the feed solution to 7.5±0.5. Both the feed solution and the permeating solution were sampled for concentration determination. The solute rejection was calculated as:

$$R\% = \left(1 - \frac{c_p}{c_f}\right) \times 100\%$$

where $c_p$ and $c_f$ are the solute concentrations of the permeate solution and the feed solution, respectively.

TABLE 1

Property test results

| Item | Water flux at 0.5 MPa (L/m² · h) | 0.5 MPa NaCl rejection rate/% | 0.5 MPa MgSO$_4$ rejection rate/% |
|---|---|---|---|
| Example 1 | 25.17 | 97.71 | 99.43 |
| Example 2 | 26.69 | 96.37 | 99.10 |
| Example 3 | 25.39 | 97.64 | 99.24 |
| Example 4 | 27.90 | 97.81 | 99.45 |
| Example 5 | 36.17 | 96.84 | 99.51 |
| Example 6 | 40.44 | 95.36 | 99.48 |
| Example 7 | 26.22 | 99.19 | 99.73 |
| Example 8 | 26.21 | 99.21 | 99.65 |
| Example 9 | 27.00 | 94.32 | 99.01 |
| Example 10 | 30.14 | 98.92 | 99.56 |
| Example 11 | 36.17 | 95.44 | 99.06 |
| Example 12 | 39.80 | 97.61 | 99.59 |
| Example 13 | 38.76 | 96.21 | 99.10 |
| Example 14 | 31.93 | 97.47 | 99.28 |
| Example 15 | 26.04 | 97.73 | 99.03 |
| Example 16 | 34.12 | 97.48 | 99.49 |
| Example 17 | 33.33 | 97.18 | 99.14 |
| Example 18 | 30.51 | 98.56 | 99.22 |
| Example 19 | 30.43 | 98.50 | 99.16 |
| Example 20 | 27.11 | 97.84 | 99.28 |
| Example 21 | 29.05 | 97.04 | 99.19 |
| Example 22 | 25.01 | 98.87 | 99.65 |
| Example 23 | 26.06 | 98.79 | 99.58 |
| Example 24 | 27.83 | 97.48 | 99.22 |
| Example 25 | 26.78 | 96.35 | 99.03 |
| Example 26 | 23.46 | 99.04 | 99.61 |
| Example 27 | 23.08 | 98.81 | 99.13 |
| Comparative Example 1 | 16.15 | 99.22 | 99.50 |
| Comparative Example 2 | 83.55 | 7.11 | 21.33 |
| Comparative Example 3 | 26.00 | 60.54 | 84.25 |
| Comparative Example 4 | 14.02 | 99.28 | 99.68 |
| Comparative Example 5 | 26.87 | 79.72 | 95.14 |
| Comparative Example 6 | 16.52 | 99.22 | 99.51 |
| Comparative Example 7 | 53.72 | 14.05 | 34.16 |
| Comparative Example 8 | 10.35 | 98.55 | 99.06 |
| Comparative Example 9 | 10.59 | 98.75 | 99.04 |
| Comparative Example 10 | 17.09 | 98.16 | 99.01 |

As can be seen from Table 1 and FIGS. 1 to 5, at the filtration pressure of 0.5 MPa, the nanofiltration membranes prepared in Examples 1 to 4 of the application have a monovalent salt NaCl rejection rate of 96% or above and a divalent salt MgSO$_4$ rejection rate of 99% or above, and their pure water fluxes are greater than 25 L/m²·h. It indicates that the nanofiltration membranes prepared in Examples 1 to 4 of the application have relatively high water fluxes and are hardly clogged, and their rejection rates are still maintained at a relatively high level. Moreover, the nanofiltration membranes of the application have both high water flux and high rejection rate at a filtration pressure of 0.5 MPa and have low industrialization energy consumption, which is suitable for large-scale industrial production.

Figure 2A:
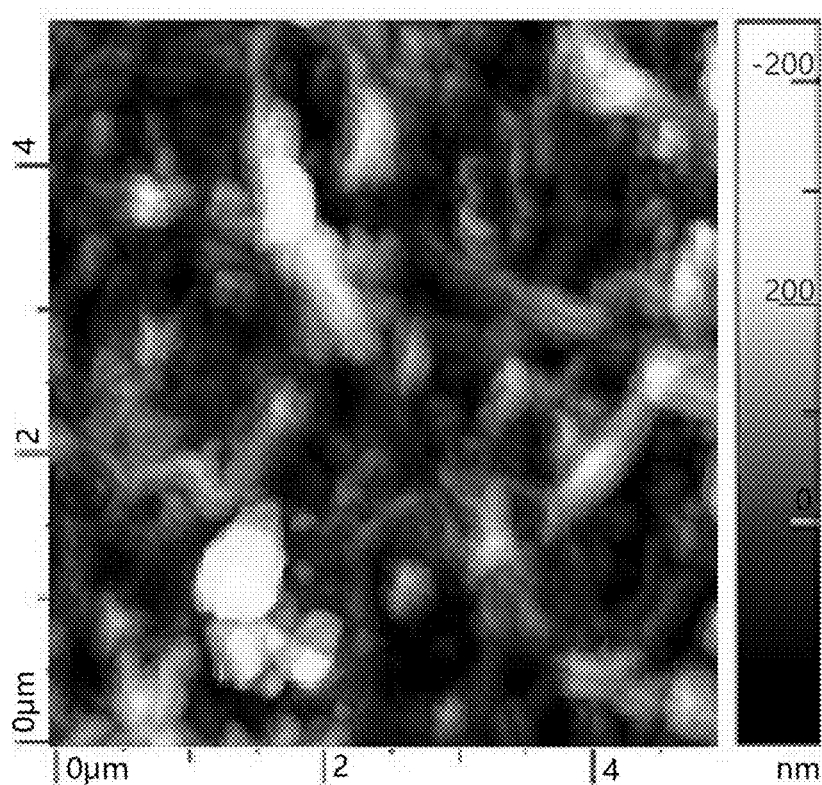
FIGS. 2(a) to (d) show the surface appearances of nanofiltration membranes under AFM in the case of addition of different concentrations of acetone.
Figure 2B:
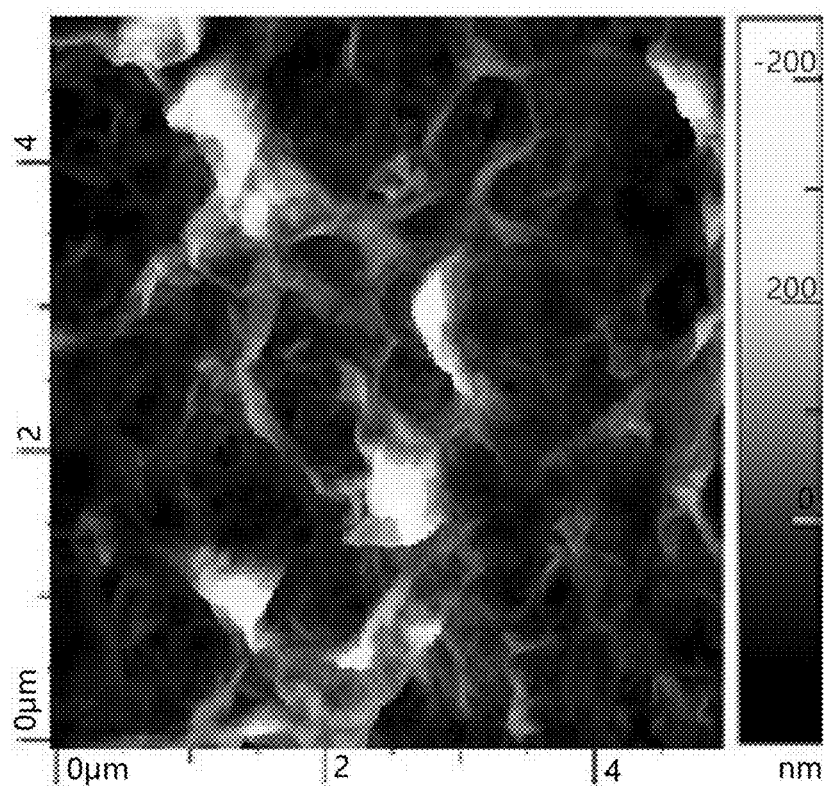

Comparing Examples 5 to 6 with Example 4, although the rejection rates of Examples 5 to 6 are slightly lower than the rejection rate of Example 4, the water fluxes of Examples 5 to 6 are significantly higher than the water flux of Example 4. Moreover, with reference to FIG. 2(a) (the content of acetone is 0.5 wt %) and FIG. 2(b) (the content of acetone is 1 wt %), it can be seen that the size of the ridge structure of the nanofiltration membrane in FIG. 2(b) is larger than that in FIG. 2(a), and the density of the nanofiltration membrane in FIG. 2(b) is lower than that in FIG. 2(a), indicating that further controlling the content of acetone by weight can further improve the water flux of the nanofiltration membrane, and although the rejection rate will be reduced, the reduction is slight, and the rejection rate can still be maintained at a high level.

Figure 3A:
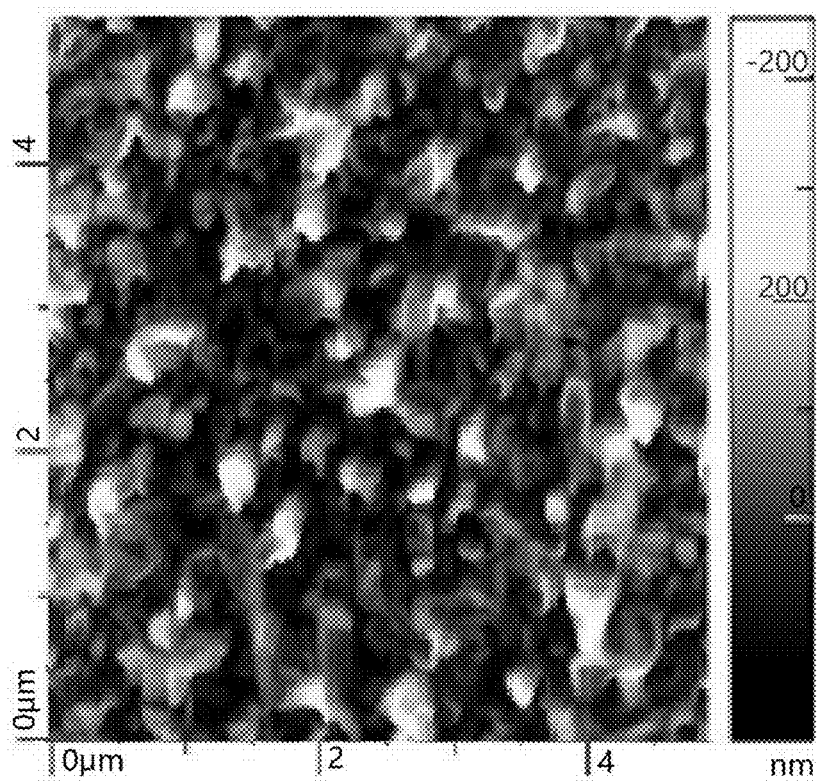
FIGS. 3(a) to (g) show the surface appearances of nanofiltration membranes under AFM in the case of addition of different concentrations of ethyl acetate.
Figure 3B:
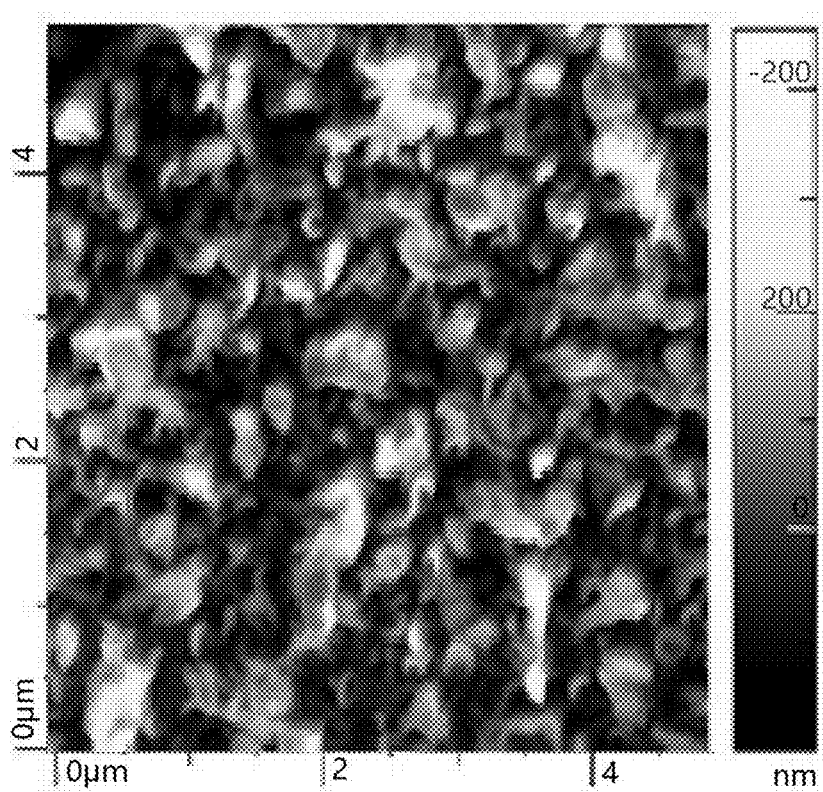
Figure 3C:
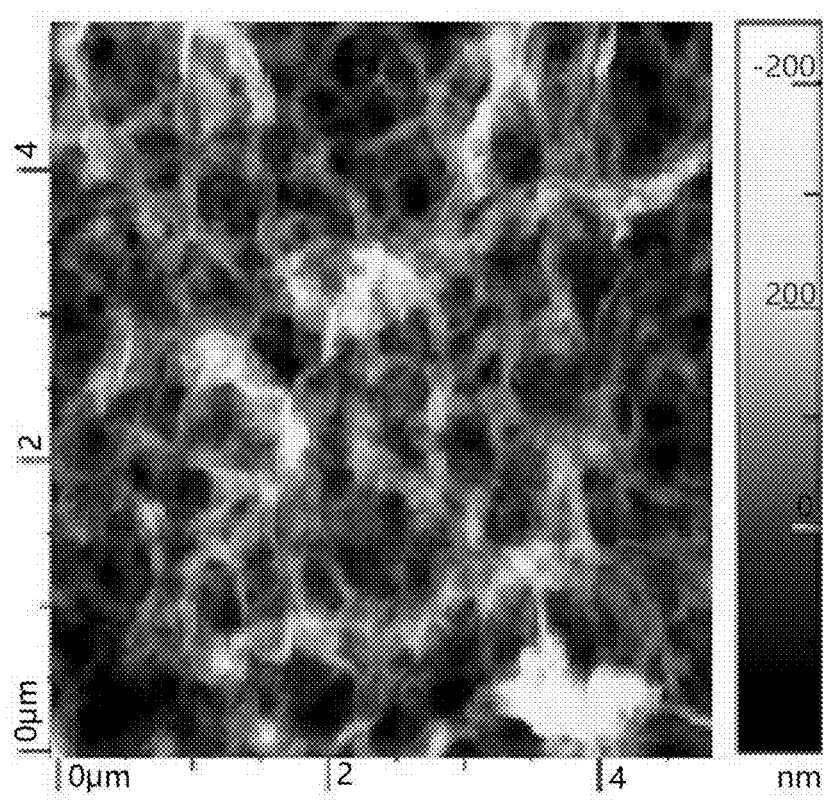

The nanofiltration membranes prepared in Examples 7 to 9 have a monovalent salt NaCl rejection rate of 94% or above and a divalent salt MgSO$_4$ rejection rate of 99% or above, and their pure water fluxes are greater than 26 L/m²·h. Moreover, with reference to FIG. 3(a) (the content of ethyl acetate is 0.5 wt %), FIG. 3(b) (the content of ethyl acetate is 0.3 wt %) and FIG. 3(c) (the content of ethyl acetate is 8 wt %), it can be seen that the sizes of the ridge structures of the nanofiltration membranes in FIGS. 3(a) to (c) are all larger than the size of the ridge structure of the nanofiltration membrane in FIG. 1, and the density of the nanofiltration membranes in FIGS. 3(a) to (c) is lower than that in FIG. 1, indicating that replacing acetone with ethyl acetate can still ensure that the prepared nanofiltration membranes have both high rejection rate and high water flux.

Figure 3D:
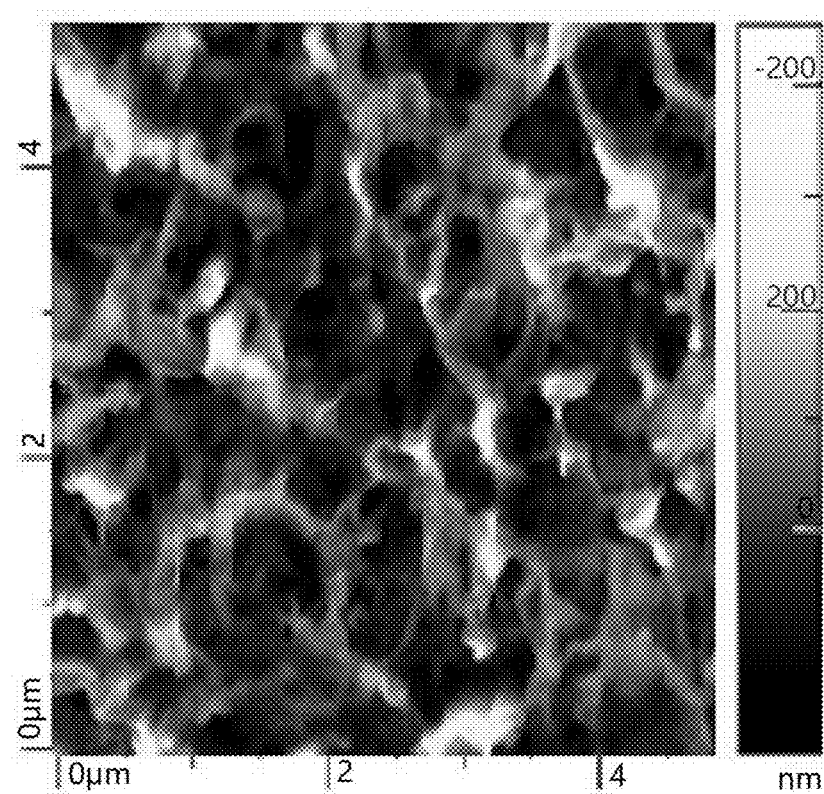
Figure 3:
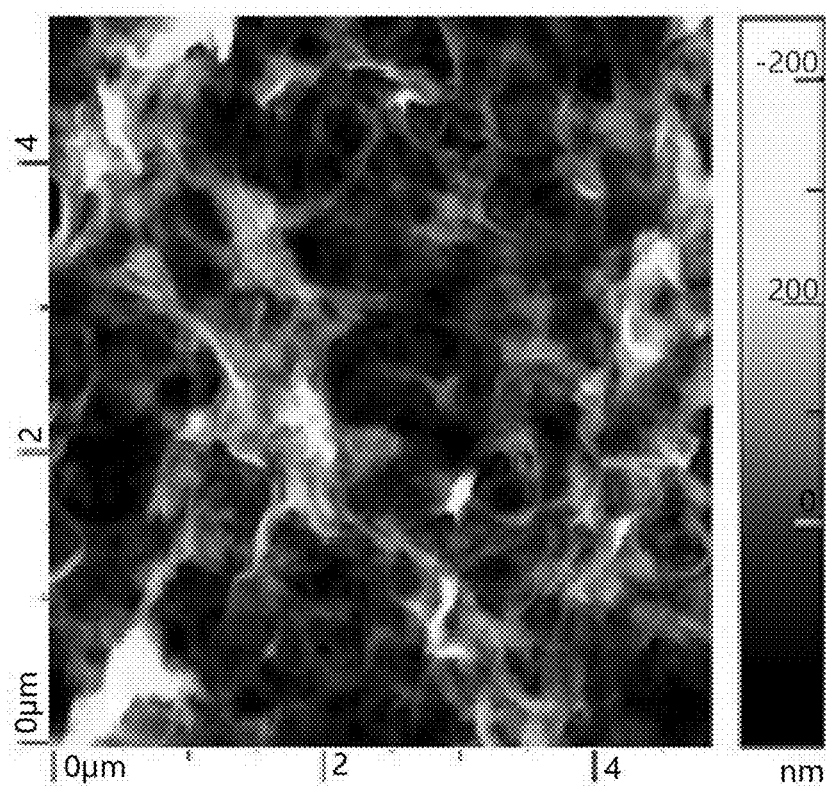
Figure 3:
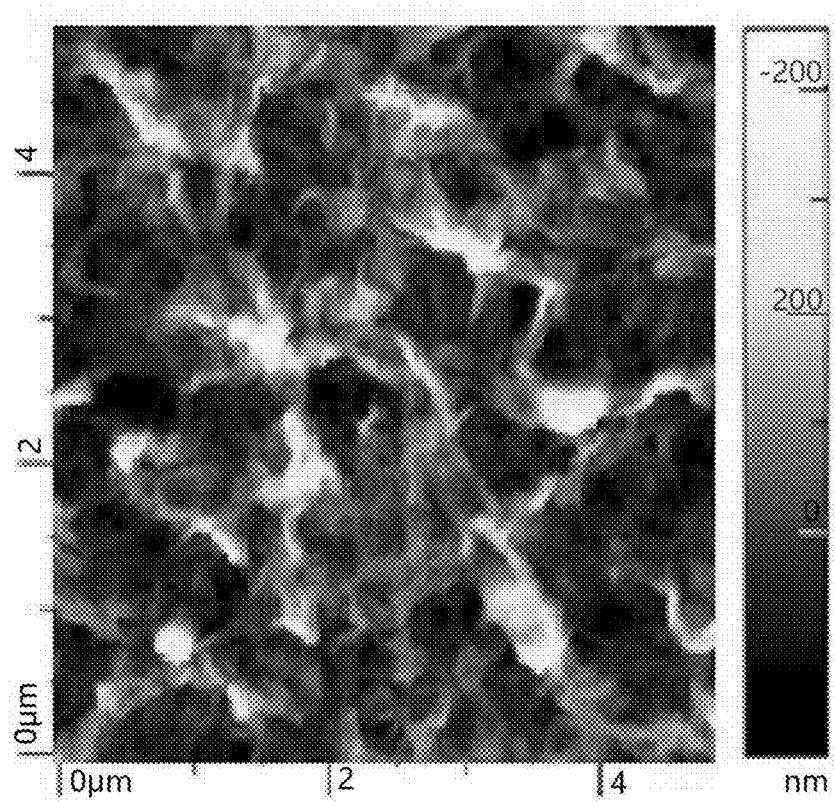
Figure 3:
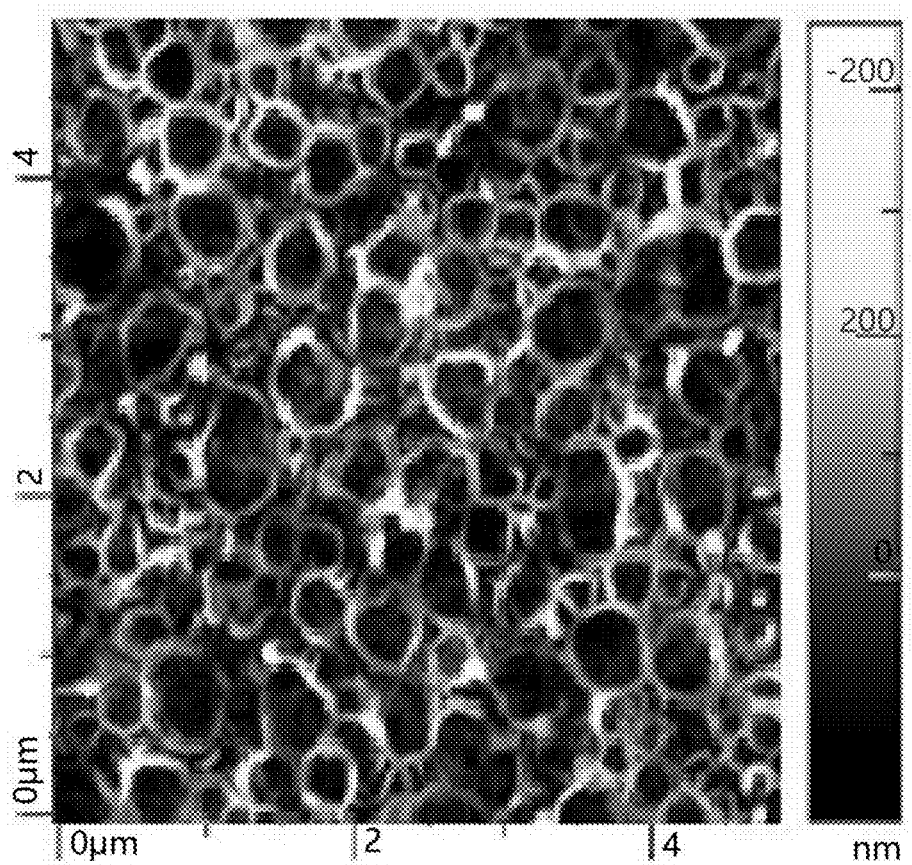
Figure 4A:
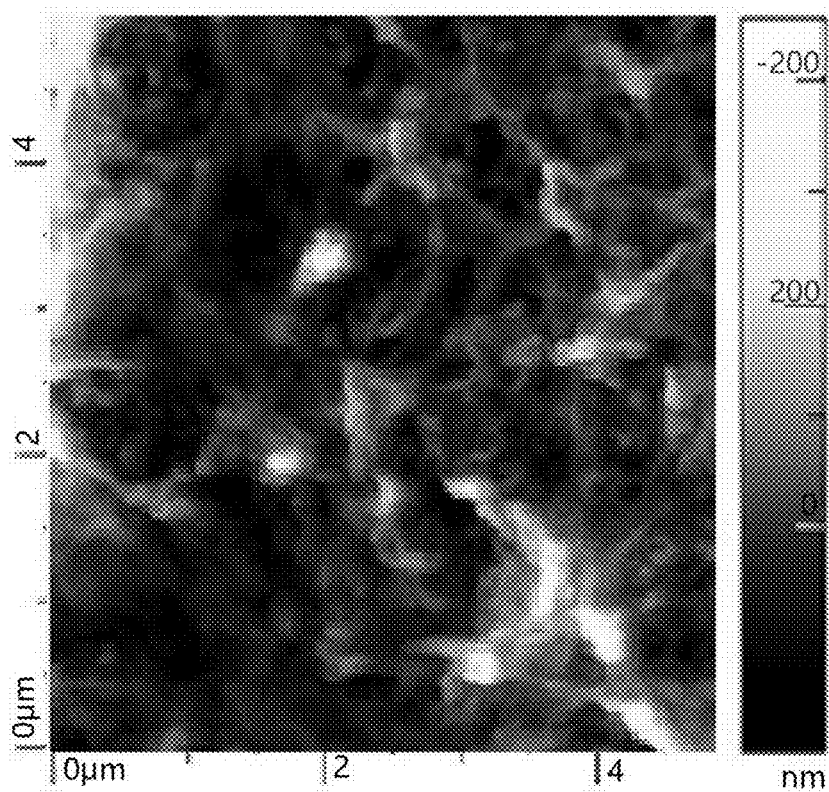
FIGS. 4(a) to (e) show the surface appearances of nanofiltration membranes under AFM in the case of addition of different acetates.
Figure 4B:
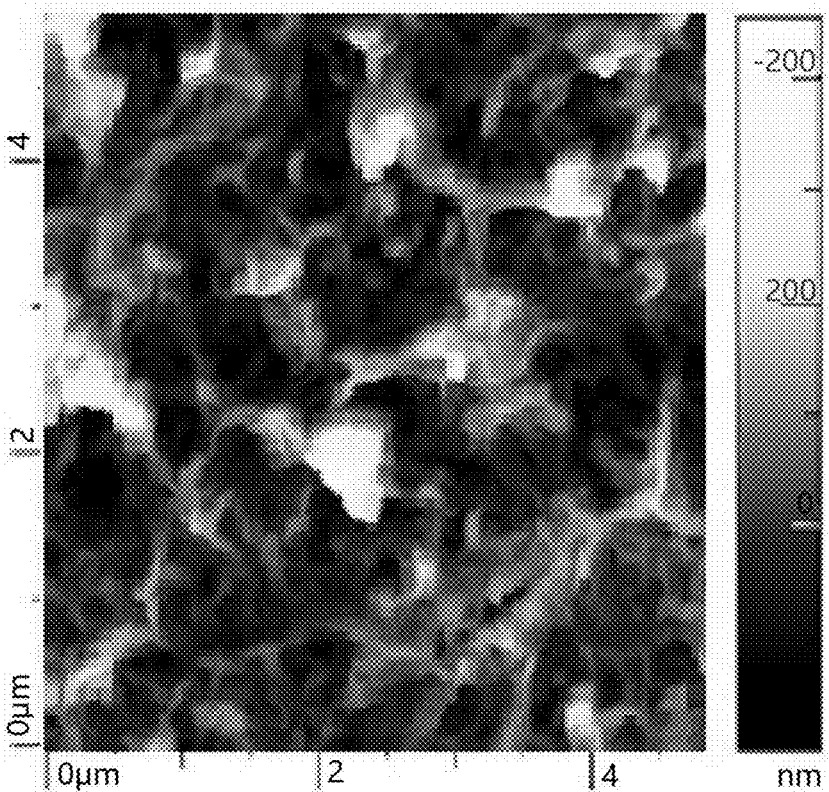
Figure 4:
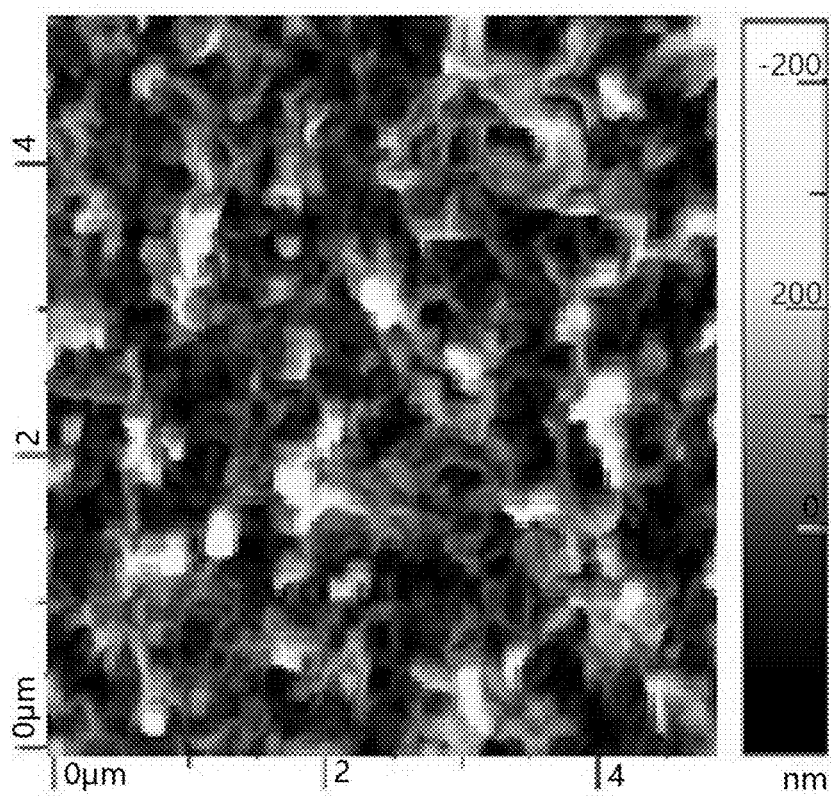
Figure 4D:
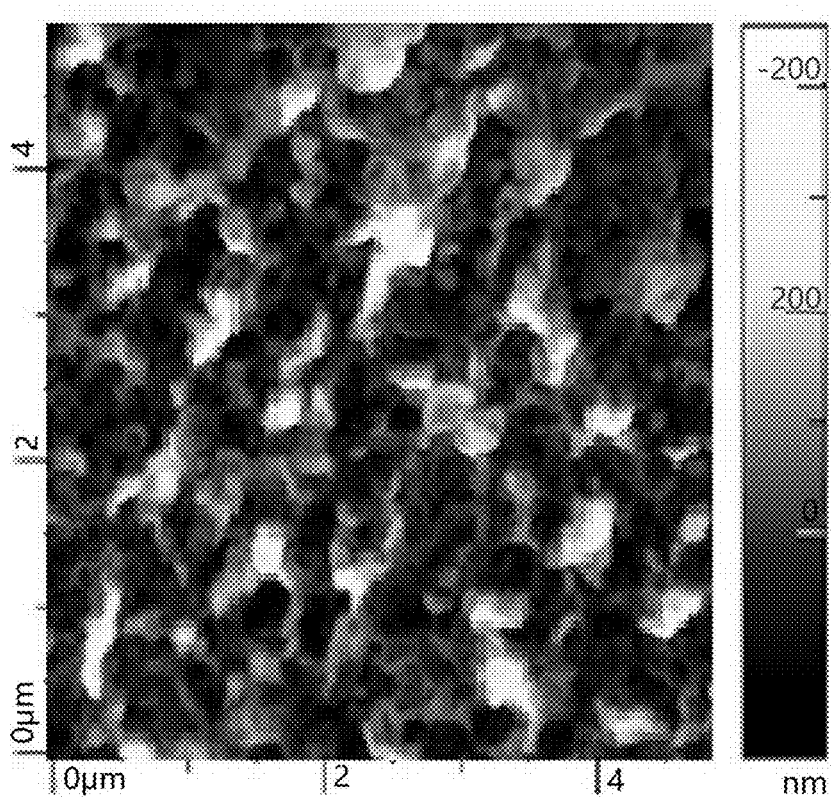
Figure 4:
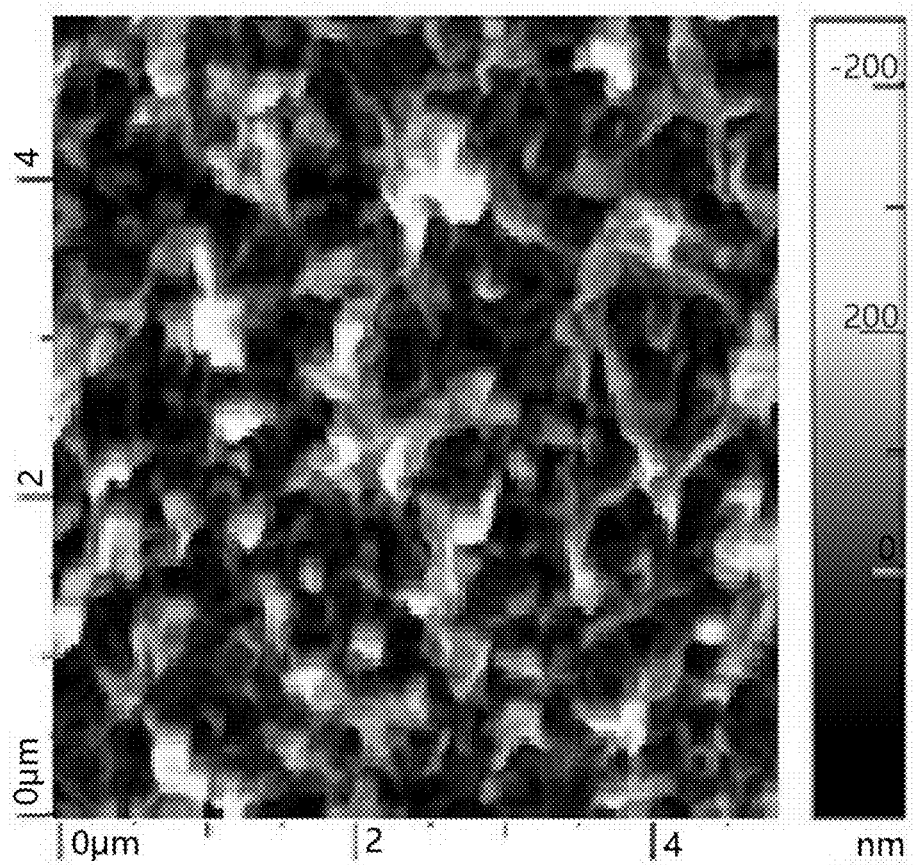

Comparing Examples 10 to 11 with Example 9, the rejection rates and water fluxes of Examples 10 to 11 are both higher than the those of Example 9. Moreover, with reference to FIG. 3(d) (the content of ethyl acetate is 2 wt %), FIG. 3(e) (the content of ethyl acetate is 6 wt %), and FIG. 3 (c) (the content of ethyl acetate is 8 wt %), it can be seen that the sizes of the ridge structures of the nanofiltration membranes in FIGS. 3(d) to (e) are all larger than the size of the ridge structure of the nanofiltration membrane in FIG. 3(c), and the density of the nanofiltration membranes in FIGS. 3(d) to (e) is slightly lower than that in FIG. 3(c), indicating that further controlling the content of ethyl acetate by weight can further improve the water flux and rejection rate of the nanofiltration membrane.

Comparing Example 12 with Example 11, the rejection rate and water flux of Example 12 are both higher than the those of Example 11. Moreover, with reference to FIG. 3(f) (the content of ethyl acetate is 4 wt %) and FIG. 3(e) (the content of ethyl acetate is 6 wt %), it can be seen that the size of the ridge structure of the nanofiltration membrane in FIG. 3(f) is moderate and its density is moderate, indicating that further controlling the content of ethyl acetate to be 4 wt % can further improve the water flux and rejection rate of the nanofiltration membrane.

The nanofiltration membranes prepared in Examples 13 to 17 have a monovalent salt NaCl rejection rate of 96% or above and a divalent salt MgSO$_4$ rejection rate of 99% or above, and their pure water fluxes are greater than 26 L/m$^2$·h. Moreover, with reference to FIGS. 4(a) to (e) (sequentially adopting propyl acetate, butyl acetate, amyl acetate, heptyl acetate and n-octyl acetate as organic solvents, respectively), it can be seen that the sizes of the ridge structures of the nanofiltration membranes in FIGS. 4(a) to (e) are similar to the size of the ridge structure of the nanofiltration membrane in FIG. 3(f), and the density of the nanofiltration membranes in FIGS. 4(a) to (e) is similar to that in FIG. 3(f), indicating that replacing ethyl acetate with any one of propyl acetate, butyl acetate, amyl acetate, heptyl acetate and n-octyl acetate can still ensure that the prepared nanofiltration membranes have both high rejection rate and high water flux.

Figure 5A:
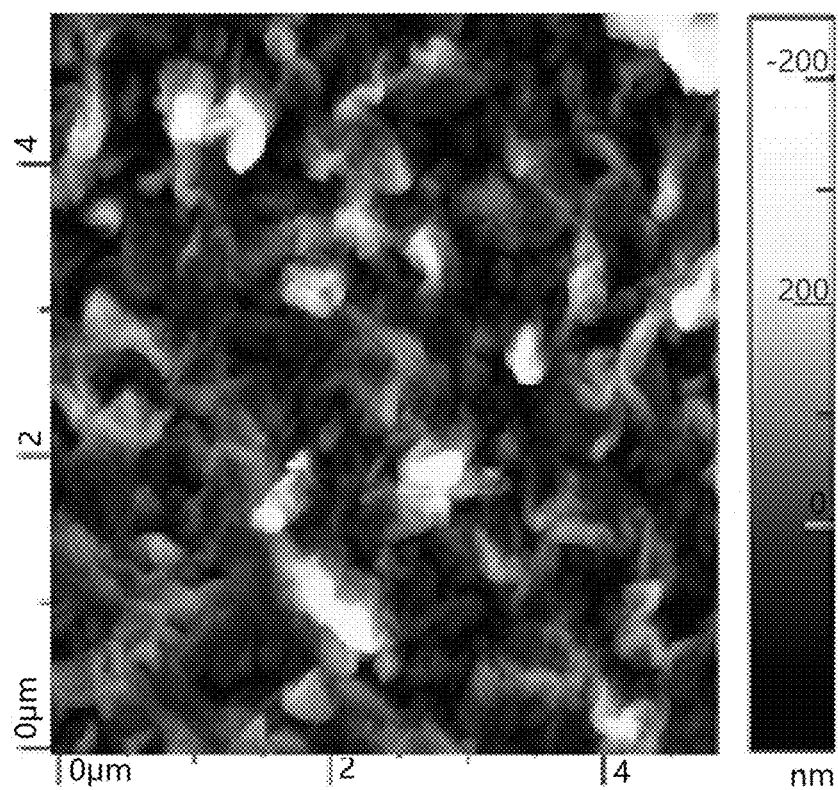
FIGS. 5(a) to (c) show the surface appearances of nanofiltration membranes under AFM in the case of addition of different organic solvents.

The nanofiltration membranes prepared in Examples 18 to 19 have a monovalent salt NaCl rejection rate of 98% or above and a divalent salt MgSO$_4$ rejection rate of 99% or above, and their pure water fluxes are greater than 30 L/m$^2$·h. Moreover, with reference to FIG. 5(a) (using Isopar G as an organic solvent), it can be seen that the size of the ridge structure of the nanofiltration membrane in FIG. 5(a) is similar to that in FIG. 3(f), and the density of the nanofiltration membrane in FIG. 5(a) is similar to that in FIG. 3(f), indicating that replacing the organic solvent n-hexane in step S2 with Isopar G can still ensure that the prepared nanofiltration membranes have both high rejection rate and high water flux.

Comparing Examples 20 to 21 with Example 3, the difference in rejection rate between Examples 20 to 21 and Example 3 is not obvious but the water fluxes of Examples 20 to 21 are higher than the water flux of Example 3. Comparing Examples 22 to 23 with Example 7, the difference in rejection rate between Examples 22 to 23 and Example 7 is not obvious but the water fluxes of Examples 22 to 23 are lower than the water flux of Example 7. All these indicate that further controlling the temperature of heat treatment can further promote the polymerization reaction, thereby further improving the water flux of the nanofiltration membrane.

Comparing Examples 24 to 25 with Example 2, the difference in rejection rate between Examples 24 to 25 and Example 2 is not obvious but the water fluxes of Examples 24 to 25 are higher than the water flux of Example 2, indicating that further controlling the contents of m-phenylenediamine and trimesoyl chloride in percentage by weight and the time of polymerization reaction of m-phenylenediamine and trimesoyl chloride can promote the polymerization reaction of m-phenylenediamine and trimesoyl chloride, thereby further improving the water flux of the nanofiltration membrane.

Figure 5B:
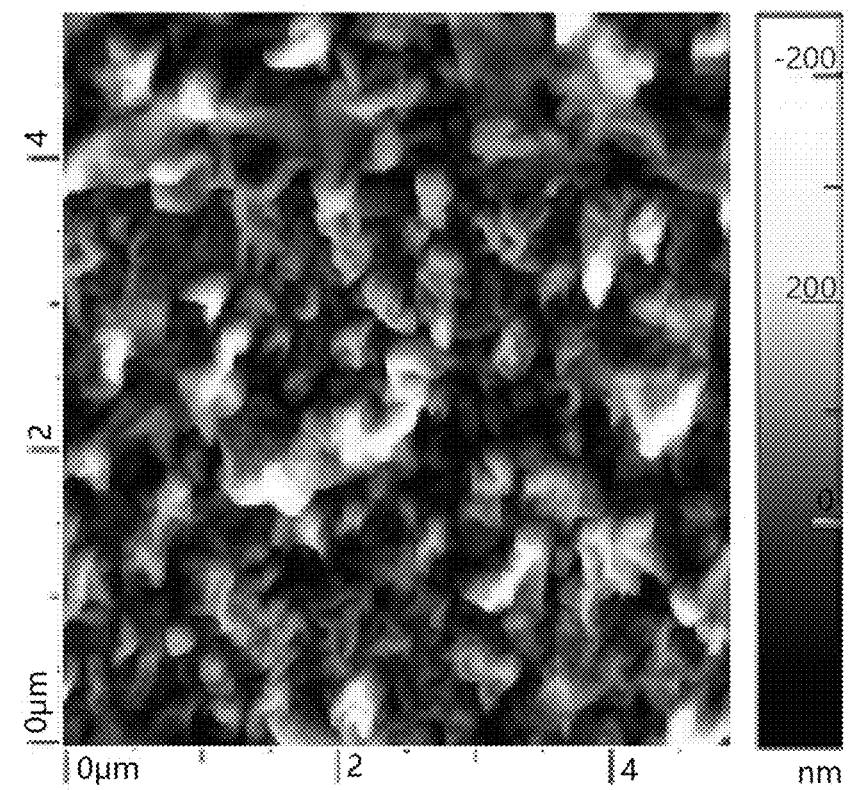
Figure 5C:
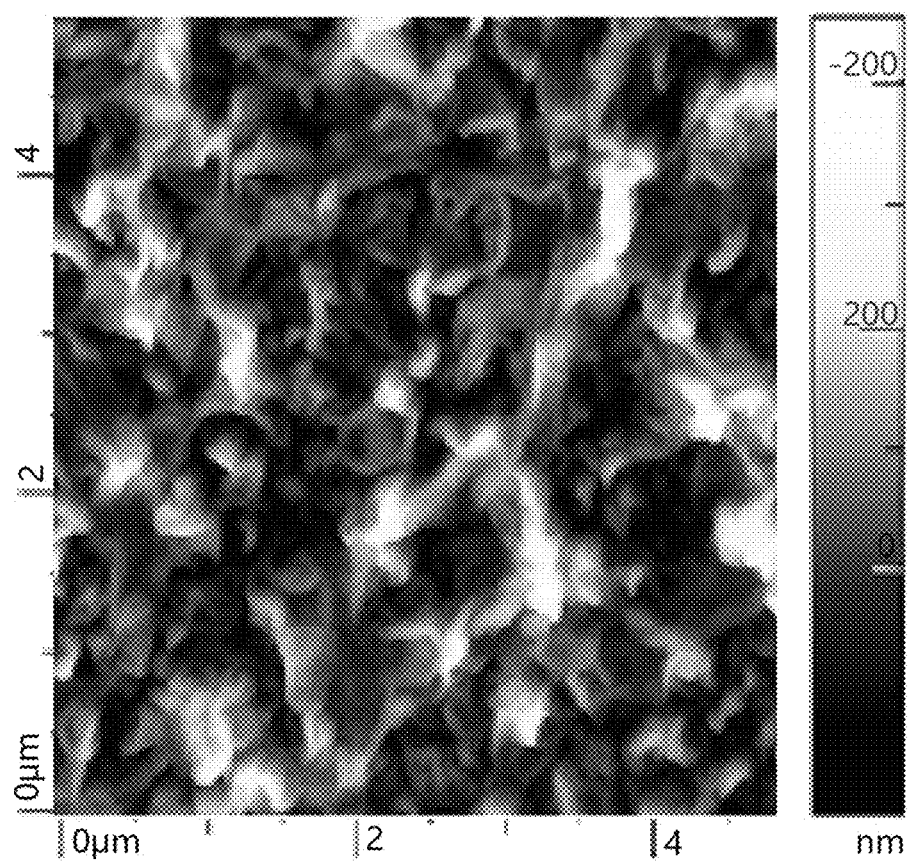

Comparing Examples 26 to 27 with Example 19, although the rejection rates of Examples 26 to 27 are slightly lower than the rejection rate of Example 19, the water fluxes of Examples 26 to 27 are obviously lower than the water flux of Example 19. Moreover, with reference to FIG. 5(b) (using Isopar H as an organic solvent) and FIG. 5(c) (using Isopar L as an organic solvent), it can be seen that the sizes of the ridge structures of the nanofiltration membranes in FIGS. 5(b) to (c) are smaller than the size of the ridge structure of the nanofiltration membrane in FIG. 5(a), and the density of the nanofiltration membranes in FIGS. 5(b) to (c) is lower than that of the nanofiltration membrane in FIG. 5(a), indicating that replacing the organic solvent with Isopar H or Isopar G reduces the water flux of the nanofiltration membrane.

Compared with Example 4, Comparative Example 1 has a high rejection rate of 99.22% but a water flux of 16.15 L/m$^2$·h which is obviously lower than that of Example 4. Moreover, with reference to FIG. 1, it can be seen that the size of the ridge structure of the nanofiltration membrane in FIG. 1 is obviously smaller than that in FIG. 2(a) and the density of the nanofiltration membrane in FIG. 1 is significantly higher than that in FIG. 2(a), indicating that the structure of the PA layer cannot be changed without adding an interfacial auxiliary polymerization agent such as acetone, resulting in that the obtained nanofiltration membrane is too dense and has a extremely low water flux.

As compared with Example 4, Comparative Examples 2 to 3 have similar water flux, even some has much higher water flux than Example 4; however, the rejection rates of Comparative Examples 2 to 3 are obviously lower than the rejection rate of Example 4. This indicates that the use of N,N-dimethylformamide and 1,3-dimethyl-2-imidazolidinone to replace acetone will make the nanofiltration membranes unable to achieve both high water flux and high rejection rate.

Figure 2C:
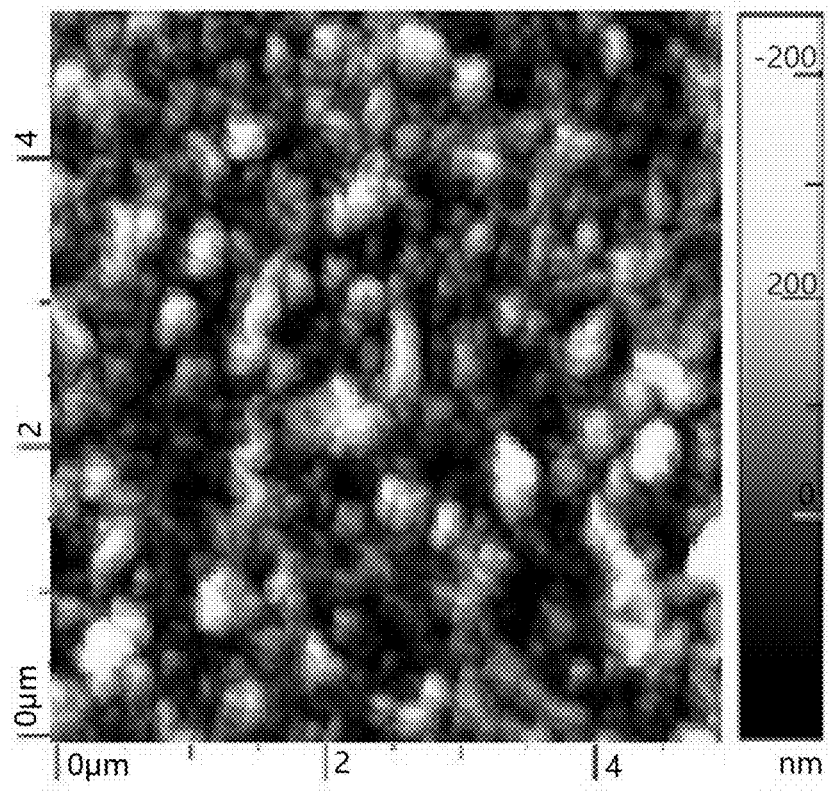
Figure 2D:
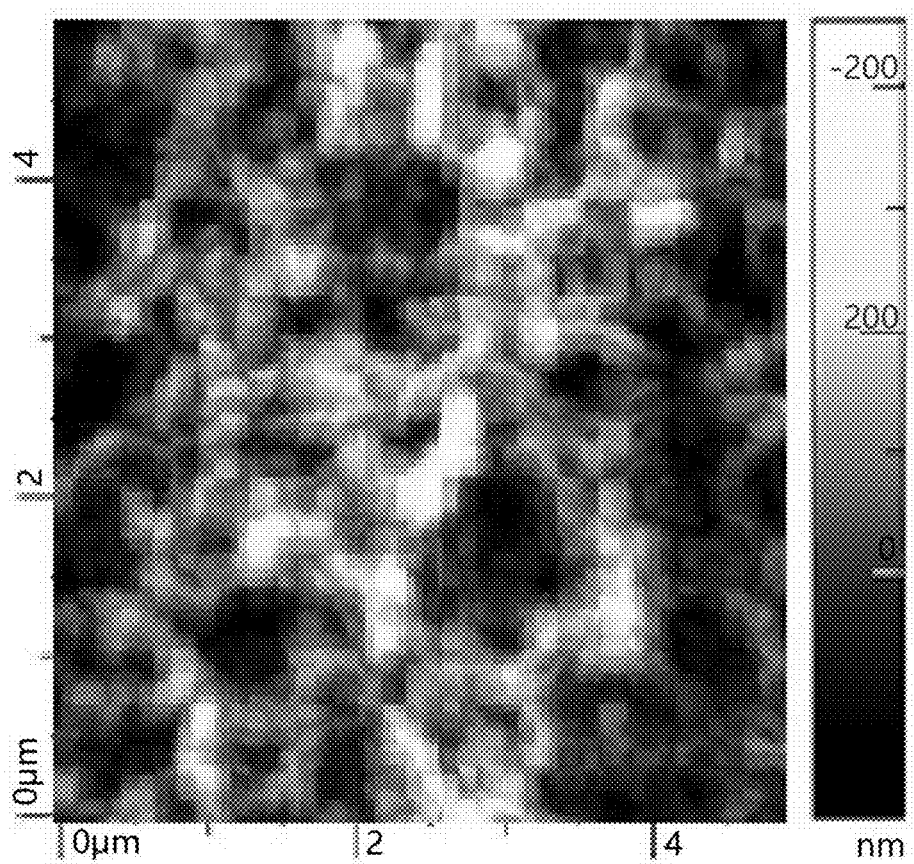

Comparing Comparative Examples 4 to 5 with Example 4, some membranes in Comparative Examples 4 to 5 have lower water flux than Example 4 and some have lower rejection rate than Example 4. Comparing Comparative Examples 6 to 7 with Example 7, some membranes in Comparative Examples 6 to 7 have lower water flux than Example 7 and some have lower rejection rate than Example 7. Moreover, with reference to FIG. 2(c) (the content of acetone is 0.1 wt %) and FIG. 2(d) (the content of acetone is 2 wt %), it can be seen that the sizes of the ridge structures of the nanofiltration membranes in FIGS. 2(c) to (d) are much smaller or much larger than the size of the ridge structure of the nanofiltration membrane in FIG. 2(a). With reference to FIG. 3(g) (the content of ethyl acetate is 10 wt %), it can be seen that the size of the ridge structure of the nanofiltration membrane in FIG. 3(g) is much smaller than that in FIG. 3(a). All these indicate that the use of acetone or ethyl acetate is not within the scope of the present invention because it will cause the nanofiltration membranes to fail in achieving both high water flux and high rejection rate.

As compared with Example 4, Comparative Examples 8 to 10 have similar rejection rate but have obviously lower water flux than Example 4, indicating that the rejection rates of Comparative Examples 2 to 3 are obviously lower than the rejection rate of Example 4. This indicates that the use of p-phenylenediamine, 3,5-diaminobenzoic acid, 2-aminobenzenesulfonic acid and other water-phase monomers to replace m-phenylenediamine will reduce the polymerization effect of water-phase monomers and organic-phase monomers, thereby reducing the water flux of the nanofiltration membranes and causing the nanofiltration membranes to fail in achieving both high water flux and high rejection rate.

The examples of this specific embodiment are all preferred embodiments of the application, and do not limit the scope of the application accordingly. Therefore, all equivalent changes made according to the structure, shape and principle of the application should be covered within the scope of protection of the application.

What is claimed is:

1. A preparation method of a nanofiltration membrane for treating printing and dyeing wastewater, comprising the following steps:

S1, pouring an aqueous solution containing m-phenylenediamine, camphorsulfonic acid and triethylamine onto a surface of a polysulfone ultrafiltration membrane, setting still for 10 s to 30 s, and then removing the excess aqueous solution from the surface, wherein a content of m-phenylenediamine ranges from 0.7 wt % to 2 wt %, a content of camphorsulfonic acid ranges from 2 wt % to 2.5 wt %, and a content of triethylamine ranges from 1 wt % to 1.5 wt %;

S2, pouring an organic solution containing trimesoyl chloride and an interface auxiliary polymerization agent onto the surface of the membrane obtained in step S1, reacting for 5 s to 20 s, and then removing the excess solution from the surface, wherein the interface auxiliary polymerization agent is acetone or acetic ester; a content of the acetone ranges from 0.5 wt % to 1 wt %, and a content of acetate ranges from 0.3 wt % to 8 wt %;

a content of the trimesoyl chloride ranges from 0.03 wt % to 0.1 wt %; and

S3, setting the membrane obtained in step S2 still and then carrying out heat treatment and water rinsing on the membrane in sequence, thus obtaining the nanofiltration membrane.

2. The preparation method of a nanofiltration membrane for treating printing and dyeing wastewater according to claim 1, wherein the content of the acetone ranges from 0.85 wt % to 1 wt %.

3. The preparation method of a nanofiltration membrane for treating printing and dyeing wastewater according to claim 1, wherein the content of the acetic ester ranges from 2 wt % to 6 wt %.

4. The preparation method of a nanofiltration membrane for treating printing and dyeing wastewater according to claim 1, wherein the acetate is any one of ethyl acetate, propyl acetate, butyl acetate, amyl acetate, heptyl acetate and n-octyl acetate.

5. The preparation method of a nanofiltration membrane for treating printing and dyeing wastewater according to claim 1, wherein an organic solvent in the organic solution is n-Hexane or Isopar G.

6. The preparation method of a nanofiltration membrane for treating printing and dyeing wastewater according to claim 1, wherein the heat treatment is carried out for curing at a temperature of 60° C. to 100° C. for 2 min to 5 min.

7. The preparation method of a nanofiltration membrane for treating printing and dyeing wastewater according to claim 6, wherein the heat treatment is carried out at a temperature of 80° C. to 100° C.

8. The preparation method of a nanofiltration membrane for treating printing and dyeing wastewater according to claim 1, wherein the polysulfone ultrafiltration membrane has a pore size ranging from 0.018 μm to 0.025 μm, and a pure water flux ranging from 200 L/(m²·h) to 400 L/(m²·h).

9. The preparation method of a nanofiltration membrane for treating printing and dyeing wastewater according to claim 1, wherein the water rinsing is carried out two to three times.

10. A nanofiltration membrane prepared by the preparation method according to claim 1.

* * * * *